United States Patent [19]
Hoffman

[11] 3,766,779
[45] Oct. 23, 1973

[54] HYDRAULIC RESPONSIVE DEVICE
[76] Inventor: Leslie J. Hoffman, c/o Orange Research Inc., 821 Derby-Milford Rd., Orange, Conn. 06477
[22] Filed: Dec. 29, 1971
[21] Appl. No.: 213,397

[52] U.S. Cl. .................................................. 73/228
[51] Int. Cl. ............................................. G01p 5/02
[58] Field of Search..................... 73/228, 211, 186, 73/432 A; 74/DIG. 4

[56] References Cited
UNITED STATES PATENTS
3,429,291  2/1969  Hoffman ............................. 116/70
2,487,083  11/1949  Warshaw ....................... 73/211 UX
2,987,915  6/1961  Hildenbrandt ....................... 73/228
3,140,606  7/1964  Kramer et al. .................... 73/228 X FOREIGN PATENTS OR APPLICATIONS
645,490  11/1950  Great Britain ....................... 73/228
1,171,631  6/1964  Germany ............................. 73/228
1,103,119  2/1968  Great Britain ....................... 73/228

Primary Examiner—James J. Gill
Attorney—H. Gibner Lehmann

[57] ABSTRACT

A hydraulic flow indicating instrument for connection in a line carrying fluid. A non-magnetic, sealed pressure casing is provided having a chamber formed by a cylinder, communicating with an entry port and an exit port. A piston having an orifice through which the fluid under pressure can flow, is movable in the cylinder, which also carries an annular permanent magnet placed end-to-end with the piston. The piston and magnet are biased by a spring to an upstream position considering the flow of the fluid entering through the entry port. A slave member having a slave magnet under the influence of the magnetic field of the annular permanent magnet is rotatably mounted on the casing externally of the chamber. As the position of the piston and annular magnet changes due to variations in pressure or fluid flow, the slave member and slave magnet are turnably adjusted in response thereto. The slave member can have an indicating pointer movable over a dial mounted on the casing, to disclose the rotary position of the slave member. The movement of the slave member in response to changes in the position of the piston and annular magnet is also employed to actuate miniature snap-action switches which can be used for energizing warning lights and activating circuitry to control pumps and other devices. The sealed casing has a pair of expansive opposite exterior surfaces to one of which the back of the dial is secured, said casing constituting a protection and firm support for virtually all of the rear of the dial whereby the latter is not likely to be damaged under adverse conditions of use.

4 Claims, 12 Drawing Figures

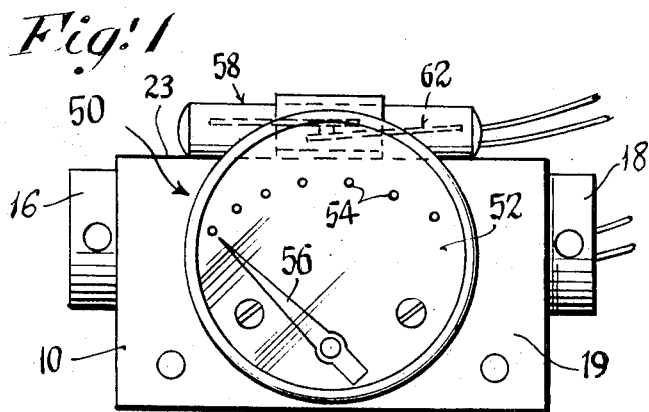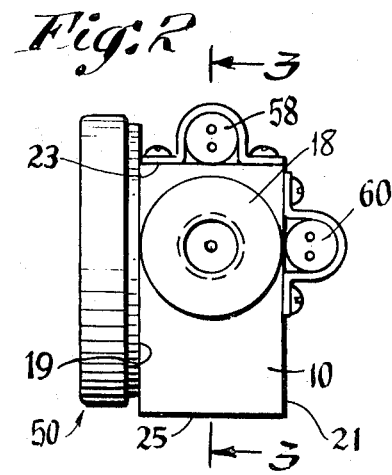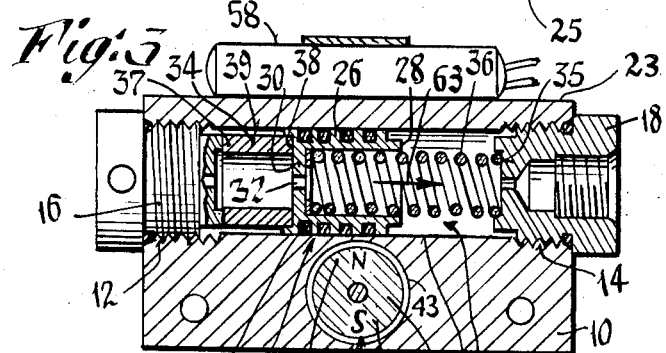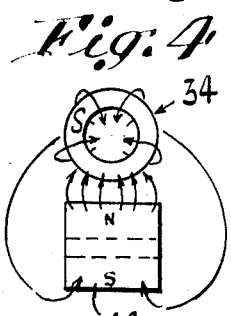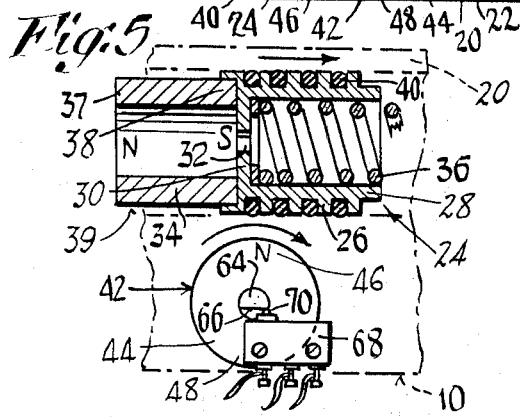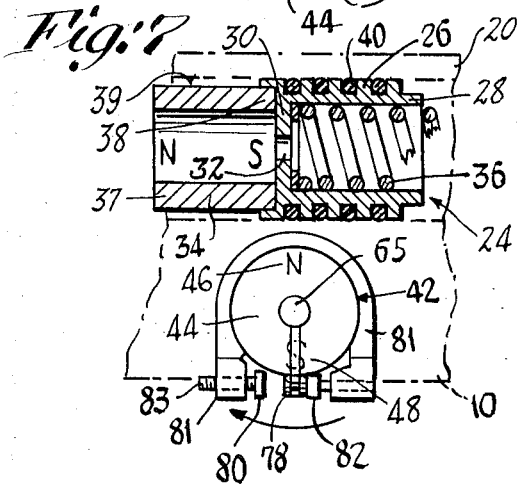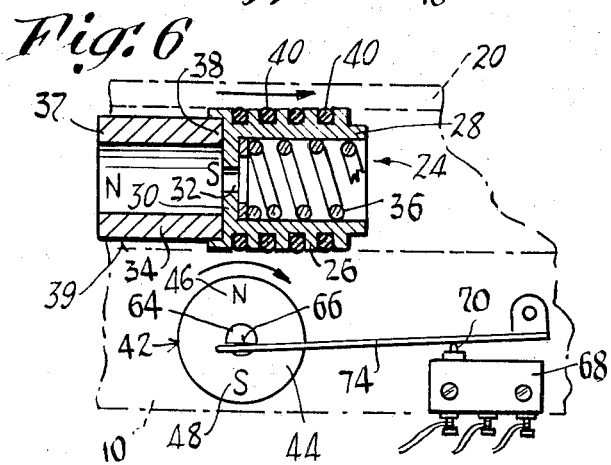
INVENTOR
Leslie J. Hoffman
BY H. Gibner Lehmann
AGENT

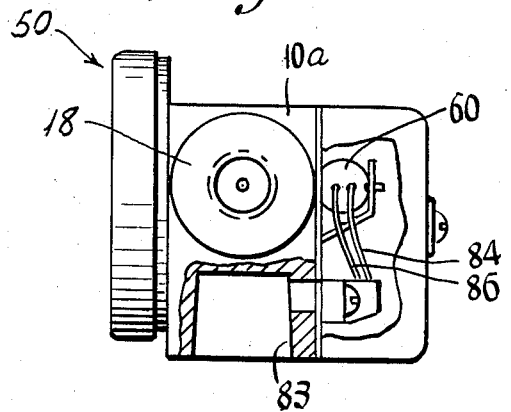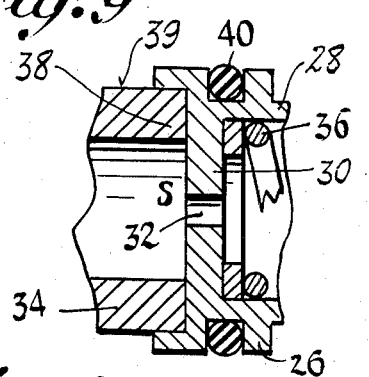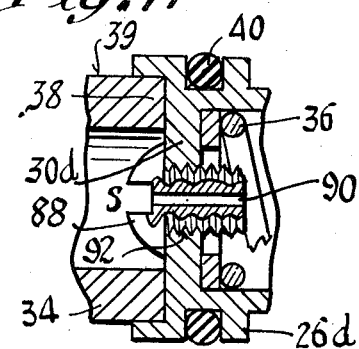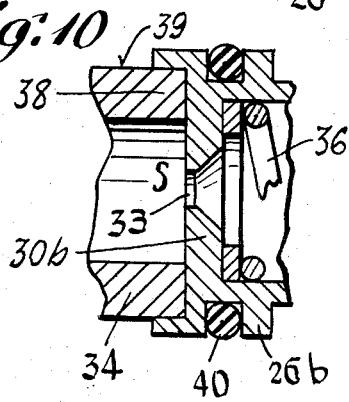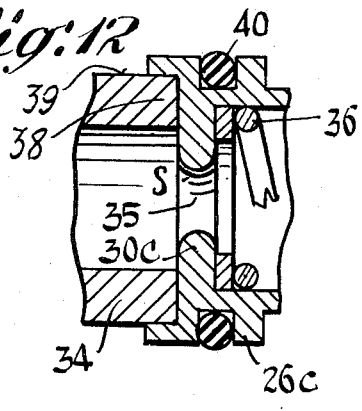

HYDRAULIC RESPONSIVE DEVICE

BACKGROUND

This invention relates to hydraulic responsive devices, and more particularly to devices of the type employing a pressure casing having a cylinder and a piston movably mounted therein, a permanent magnet carried by the piston, and an indicating or switching device under the influence of the magnetic field of the permanent magnet and actuatable in response to movements thereof. A number of prior fluid actuated control and indicator devices of the type noted have been proposed and constructed. While these prior devices were for the most part satisfactory in operation, there were usually drawbacks in their construction. In many cases a significant amount of connecting hardware, including T-fittings and adaptor-type connectors were required in order to connect the device to the line. Several of the prior devices required piston seals to minimize leakage of the fluid, and to minimize inaccuracies in measurements due to loss of pressure resulting therefrom. Still other devices lacked sensitivity as far as indicating small changes in pressure. Fairly complex indicator movements intended to increase sensitvity of the indicator device were expensive to manufacture, as well as being costly to maintain and to service.

In still other cases, dial-type indicators were disposed in protruding positions whereby they were likely to suffer damage due to blows or other causes common in the operation of machines, machine tools and the like.

SUMMARY

The above drawbacks and disadvantages of hydraulic responsive devices are overcome by the present invention, which has for an object the provision of an improved, especially sensitive hydraulic influenced instrument incorporating a piston and cylinder, wherein connections directly into the line can be made, thereby to simplify the hydraulic circuitry, and wherein a simple, complete and effective, leakproof seal is had at all times. The above object is accomplished by means of a fully sealed pressure casing constituted of non-magnetic material, having an inner chamber formed by a cylinder, and also entry and exit ports in communication with the chamber. The cylinder has a piston movably mounted therein, said piston having an orifice hole through which fluid introduced into the entry port can controllably pass. Spring means are provided which bias or move the piston to a first position opposing the flow of fluid through the entry port. An annular, flux-concentrating permanent magnet is carried by the piston and disposed end-to-end therewith so as to permit the fluid from the entry port to pass through both the magnet and the piston, and out through the exit port of the casing.

Rotatably mounted on the casing and externally of the chamber is a slave member having a permanent magnet constituting a slave, located so as to be under the influence of the magnetic field of the annular permanent magnet carried by the piston. The slave member carries an indicating pointer which is movable over the face of a dial on the casing. Any change in pressure or flow of the fluid at the entry port causes a corresponding shift in the position of the piston and annular magnet, thereby effecting a rotative adjustment of the slave member and magnet which are under the influence of the magnetic field of the annular magnet. The rotary position of the slave member is indicated by the position of the pointer relative to the face of the dial. The casing 10 is somewhat in the nature of a slab, in that it has a pair of expansive, oppositely located exterior surfaces to one of which the rear of the dial is secured. The said one expansive surface covers most of the dial rear whereby the dial is secured flat against the casing in a position which, to the greatest possible extent, is non-protruding. The casing thus protects the dial against damage, or loosening and displacement.

One embodiment of the present invention includes switch means carried by the slave member and the casing, said switch means being actuatable in response to arcuate movement of the slave member. In another embodiment a reed switch is disposed adjacent the chamber and is under the influence of the magnetic field of the annular magnet, and is actuatable in response to movement of the piston and annular magnet as a change occurs in the pressure or flow at the entry port. The switches employed can actuate warning lights, sound an alarm or can be otherwise used in control apparatus to be effective in the event that an abnormal pressure or flow occurs at the instrument.

Advantages of the invention reside in the use of a completely sealed pressure casing which eliminates all possibility of fluid leakage, such as liquid leaking out of the casing and possibly into adjacent apparatus, onto the face of the indicator dial, onto electrical wiring of the switches, or switch contacts and the like. Also, the use of an annular permanent magnet as opposed to a solid cylinder or plug-type magnet structure results in greater sensitivity of the instrument, since the magnetic flux density of the annular magnet is higher immediately adjacent the polar portions of the slave magnet than would be the case if a solid magnet of the same size and having a comparable total magnetic flux were to be used.

Other features and advantages will hereinafter appear.

FIG. 1 is a front elevational view of a hydraulic pressure and flow responsive, indicating and control type instrument as provided by the invention.

FIG. 2 is a right end elevational view of the instrument of FIG. 1.

FIG. 3 is a longitudinal sectional view taken on the line 3—3 of FIG. 2.

FIG. 4 is a diagrammatic representation of the lines of flux between the annular permanent magnet and the slave magnet of the instrument.

FIG. 5 is a detail view of the annular permanent magnet and the slave member, indicating one type of switching means as used in the present invention.

FIG. 6 is a detail view similar to that of FIG. 5, indicating another type of switching means for use in the present invention.

FIG. 7 is a detail view similar to those of FIGS. 5 and 6, indicating still another type of switching means as used by the present invention.

FIG. 8 is an end elevational view of another embodiment of the present invention, illustrating the use of a side-mounted reed switch element.

FIG. 9 is a detail of the embodiment of FIGS. 1–3, in the form of a fragmentary sectional view through portions of the piston and adjacent annular magnet.

FIG. 10 is a view like that of FIG. 9, showing another type of piston orifice hole.

FIG. 11 is a view like that of FIGS. 9 and 10, showing still another type of piston orifice hole.

FIG. 12 is a view like that of FIGS. 9–11, showing a tapped piston hole having an orifice screw which is threaded therein.

Referring to FIGS. 1–4 there is illustrated a first embodiment of hydraulic responsive device as provided by the present invention. A non-magnetic sealed pressure casing 10 is shown, having an entry port 12 and exit port 14 both of which are tapped to permit insertion therein of threaded fittings 16 and 18 respectively, to effect connections to hoses, metal tubing or the like, etc. (not shown). The pressure casing 10 is block-shaped and elongate, being provided with a cylinder having walls 20 constituting a longitudinal bore or chamber 22 which is in communication with the ports 12 and 14. The casing 10 has expansive, opposite exterior surfaces 19 and 21, and upper and lower edge surfaces 23 and 25. A fluid-responsive member 24 is provided, comprising a piston 26 having side wall portions 28 and a bottom or transverse wall portion 30. In accordance with the present invention, the bottom wall 30 of the piston is provided with an orifice 32 the size of which constitutes a flow control as will be explained later. Further, in accordance with the invention there is provided an annular permanent magnet 34 which is affixed end-to-end against the piston 26 whereby both are movably mounted within the cylinder 20. By such organization it will be seen that fluid can flow completely through the fluid-responsive member comprising the piston 26 and magnet 34. The significance of this is explained in detail below.

The fluid responsive member 24 is biased to a first position as illustrated in FIG. 3, by a compression spring 36 engaging its bottom or transverse wall portion 30 and also the interior wall portion 35 of the exit port fitting 18. The annular permanent magnet 34 has a pair of opposite, oppositely polarized annular edge portions 37 and 38 respectively and an outer wall surface 39 closely juxtaposed to the walls of the cylinder 20. The piston 26 further can have a plurality of O-rings 40 to provide an effective seal between it and the cylinder 20.

By the present invention a slave member 42 is rotatably mounted in the casing 10 externally of the cylinder 20. The slave member 42 comprises a permanent magnet 44 in the form of a plug or drum which is disposed adjacent to and under the influence of the magnetic field of the annular permanent magnet 34. The slave member 42 advantageously comprises a diametrically polarized magnetic drum having opposite magnetic polar portions 46 and 48 each of which interacts with the opposite corresponding polarized portions 37 and 38 of the annular permanent magnet 34. Due to the fact that the casing 10 is fabricated of non-magnetic material, the above mentioned interaction of the annular permanent magnet 34 and slave magnet 44 is not disturbed by its presence in the magnetic field.

FIG. 4 is a diagrammatic representation as at present understood of the direction taken by the flux lines of force which link the annular magnet 34 and the slave magnet 44. The flux density is highest at the point where the flux lines are shown spaced most closely together. The flux density as supplied by the annular magnet 34 is considered to be greater than that which would exist if a solid plug-like magnet were to be substituted, having the same total flux, in place of the annular magnet configuration. Thus, the higher flux density due to the use of an annular magnet 34 effects a more sensitive response between the latter and the slave magnet 44.

Referring to FIGS. 1 and 3 the sealed pressure casing 10 carries an indicator device 50 comprising a dial 52 having indicia 54 thereon. An indicating pointer 56 is rotatable with the slave member 42, being movable over the face of the dial 52 for indicating the position of the member 42 and thus the piston 26. In consequence, the pointer 56 will show pressure and flow changes of fluid passing from the inlet port 12 to the outlet port 14, without likelihood of fluid leakage and with appreciable sensitivity.

By the present invention magnetically operable switch means 58 and 60, illustrated in FIGS. 1 and 2, are mounted on the casing 10 externally of the chamber 22. The switch means 58 and 60 can advantageously be of the magnetically operable reed type, having a movable magnetic member 62 therein to open and close the circuit in the presence of a magnetic field of sufficient intensity. The switches 58, 60 are disposed adjacent to and under the influence of the magnetic field of the annular magnet 34, and are actuatable in response to movement of the annular magnet 34 in the direction indicated by the arrow 63 in FIG. 3.

Referring to FIG. 3, the operation of the hydraulic pressure and flow indicator and control device can now be readily understood. With the device installed in a line to be monitored, which carries fluid under pressure, a fluid flow will occur through the entry port 12, through the annular permanent magnet 34, the orifice hole 32 in the piston 26 and out through the exit port 14. The piston 26 and annular magnet 34 will assume a predetermined position of equilibrium, which could be near the portion of the cylinder 20 which is adjacent the entry port 12. The force due to the pressure of the fluid at the entry port 12 acts on the bottom or transverse wall 30 of the piston 26 and opposite to the force of the biasing spring 36. This predetermined position of the piston is dependent on the pressure of the fluid at the entry port 12, the viscosity of the fluid passing therethrough, and the stiffness of the biasing spring 36. The factors are involved in the flow of fluid from the port 12 to the port 14, as will be understood. The equilibrium position of the piston 26 and annular magnet 34 will affect the rotary position of the slave member 42 and indicating pointer 56 carried thereby, thus yielding an "equilibrium" or basic pressure reading on the indicator dial 52. For this position of the annular magnet 34, the switch means 58 and 60 although under the influence of the magnetic field thereof are not yet actuated thereby due to the distance or spacing. Considering now changes in pressure and flow at the entry port 12 with respect to pressure and flow at the exit port 14, these will cause a change in the position of the piston 26 and the annular magnet 34. An increase in pressure at the entry port 12 will give rise to movement of the piston 26 and annular magnet 34 in the direction indicated by the arrow 63 in FIG. 3. Due to the above mentioned magnetic interaction between the annular magnet 34 and the slave magnet 44, the slave member 42 will be shifted clockwise as viewed in FIG. 3, thereby moving the indicating pointer 56 in FIG. 1 upscale. Further changes in the pressure at the entry port 12 will cause corresponding changes in the position of the piston 26 and annular magnet 34, further effecting corresponding movements of the slave member 42, and giving rise to new readings of the indicating pointer 56. By proper positioning of the switch means 58 and 60, actuation thereof can be accomplished when the annular magnet 34 is shifted in the direction indicated by arrow 63 in FIG. 3 past a predetermined point corresponding to a predetermined pressure and flow. The switch means 58 and 60 can be employed to activate warning lights or other control or alarm circuitry (not shown), as will be understood.

Another embodiment of the invention is shown in FIG. 5, in which the slave member 42 is carried by a shaft 64 and is rigid with respect thereto but adjustable thereon, said shaft having a cam portion 66. A snap action switch or microswitch 68, having a movable actuator member or button 70 engageable by said cam portion 66, is mounted on the casing 10. In response to left-to-right movement of the piston 26 and annular magnet 34 the slave member 42 and shaft 64 are turnably driven clockwise, all as viewed in FIG. 5, thereby depressing the actuator member 70 and closing (or opening) the switch 68. The rotary position of the slave member 42 can be adjusted with respect to the cam portion 66 of the shaft 64 to permit a desired intitial setting of the rotary position of the slave member at which the switch 68 is actuated.

Still another embodiment of the invention is shown in FIG. 6. The slave member 42 carried by the shaft 64 is turnably adjustable with respect thereto, said shaft having a cam portion 66. A lever 74 is pivotally mounted at one end of the casing 10, and at its other end is engageable by the cam portion 66 of the shaft 64. The lever 74 is also engageable with the actuator button 70 of the microswitch 68 mounted on the casing 10. In response to left-to-right movement of the piston 26 and annular magnet 34, the slave member 42 in FIG. 6 is turnably driven clockwise, thereby shifting the lever 74 so as to depress the button 70 of the switch 68. Again, the rotary position of the slave member 42 can be adjusted with respect to the cam portion 66 of the shaft 64 to permit initial setting of the rotary position of the member 42, at which the switch 68 is actuated.

Yet another embodiment of the invention is illustrated in FIG. 7, in which the slave member 42, carried by the shaft 65, has a contact 78 mounted thereon. An adjustment plate 81 is turnably carried by the casing 10 and has contacts 80 and 82 which are engageable with the moving contact 78. In response to clockwise turning of the slave member 42, the contacts 78 and 82 will "open" and the contacts 78 and 80 will "close." Contact 80 on the adjustment plate 81 is adjustable by means of a screw 83. The contact adjustment plate 81 may also be rotatably adjusted with respect to the slave member 42 to permit adjustable positioning of the contacts 80 and 82 with respect to contact 78.

Still another embodiment of the invention is shown in FIG. 8, which illustrates in addition to the sealed pressure casing 10a and magnetically operable switch means 60, an electrical socket 83 having leads 84 and 86 running therefrom to the switch means 60. The socket 83 is adapted to receive an electrical fitting (not shown) for connection to various control circuitry, alarm devices and the like.

Depending on the viscosity and the nature of the fluid in conjunction with which the hydraulic pressure and flow responsive device of the present invention is to be employed, it is advantageous to maintain the capability of providing for more than one configuration and size of orifice hole 32. The various forms that the orifice holes may take are illustrated in FIGS. 9–12.

FIGS. 3 and 9 illustrate a straight orifice hole 32 in the wall 30 of piston 26, said hole having a substantially cylindrical configuration to obtain a certain flow characteristic. The hole 32, further, is simple to make since it involves merely a drilling operation.

FIG. 10 illustrates an orifice hole 33 in a transverse wall 30b of a modified piston 26b, said hole having a substantially funnel-shaped configuration. FIG. 11 illustrates the use of a screw 88 having a longitudinal bore 90, threaded into a tapped hole 92 in the transverse wall portion 30d of the piston 26d. The size of the bore 90 in the screw 88 constitutes a flow control. The use of a screw 88 permits selection of a number of various configurations and sizes for the orifice hole, thereby permitting the instruction to be used with fluids having widely varying viscosities and flow characteristics.

FIG. 12 discloses an orifice hole 35 in the bottom or transverse wall portion 30c of the further modified piston 26c, the edge portions of said orifice being rounded.

It will now be understood from the foregoing that I have provided a novel and improved hydraulic pressure and flow responsive device which is especially simple in construction, sensitive in its ability to measure changes in pressure or flow, and which requires a minimum of connecting hardware to be employed for its application and use.

Variations and modifications are possible without departing from the spirit of the invention.

I claim:

1. A by-pass, flow-through type, differential-pressure, fluid-actuated indicating instrument, comprising in combination:
   a. a sealed, pressure casing constituted as a one-piece elongate block having expansive opposite outside surfaces, having opposite edge surfaces coextensive with said expansive outside surfaces, and having a longitudinal bore extending along and closely adjacent one of said edge surfaces, and further having ports located at opposite ends of the casing and connected with said bore by which fluid can be introduced into and discharged from the same,
   b. an apertured piston movably mounted in the bore and actuated by fluid passing therethrough,
   c. an annular permanent magnet having a pair of opposite and oppositely polarized annular edge portions, said magnet being connected with said piston to be actuated thereby,
   d. said block having a second bore extending transversely of said longitudinal bore and closely juxtaposed thereto, said bores being out of communication with each other
   e. a shaft turnably mounted on said block and extending into said second bore,
   f. a second permanent magnet having a north and a south pole, said magnet being disposed in the second bore and being carried on said shaft to be turnably movable therewith,
   g. said second magnet being in the field of influence of the said annular permanent magnet to be driven thereby as the piston in the casing is actuated by said fluid, h. a substantially flat dial having an expansive indicator surface, said dial being with its back disposed broadside against one of the expansive outside surfaces of the block, whereby a compact assemblage is had with a minimum amount of protrusion of the dial beyond the opposite edge surfaces of the casing, and i. a pointer carried by said shaft and movable over the expansive indicator surface of the dial to provide readings in connection therewith.

2. The invention as set forth in claim 1, wherein:

a. said shaft has a cam portion, b. a snap action switch carried by the casing and having a movable actuator member, c. said actuator member being adjacent to and adapted for engagement with the cam portion of the shaft and being actuated in response to rotation of said shaft.

3. The invention as set forth in claim 1, and further including:

a. a lever having one end pivoted on the casing, and b. a switch mounted on the casing and having an actuator button engageable with a portion of said lever, c. said shaft having a cam portion adapted for engagement with said bore to operate the same, d. said switch being actuated in response to rotation of said sceond magnet and transverse shifting of the lever.

4. The invention as set forth in claim 1, and further including:

a. a contact carried by said shaft and rotatable therewith, and b. a second contact carried by said casing, c. said first contact engaging the second in response to rotation of the shaft and second magnet, and d. means for making external electrical connections to said contacts.

* * * * *